INVENTOR.
FRANKLIN W. SMITH, JR.
BY
MORGAN, FINNEGAN, DURHAM & PINE
ATTORNEYS

INVENTOR.
FRANKLIN W. SMITH, JR.
BY
MORGAN, FINNEGAN, DURHAM & PINE
ATTORNEYS

INVENTOR.
FRANKLIN W. SMITH, JR.
BY
MORGAN, FINNEGAN, DURHAM & PINE
ATTORNEYS

United States Patent Office 3,403,248

Patented Sept. 24, 1968

3,403,248
INTERPOLATING INDUCTIVE DIVIDER

Franklin W. Smith, Jr., Port Jefferson Station, N.Y., assignor to North Atlantic Industries, Inc., Plainview, N.Y., a corporation of New York Filed Dec. 4, 1964, Ser. No. 416,021
17 Claims. (Cl. 235—196)

ABSTRACT OF THE DISCLOSURE

Interpolating inductive divider arrangements are disclosed herein with the divider stages interconnected and excited in configurations which minimize the errors associated with the flow of excitation or magnetization current through the leakage impedances.

Figure 1:
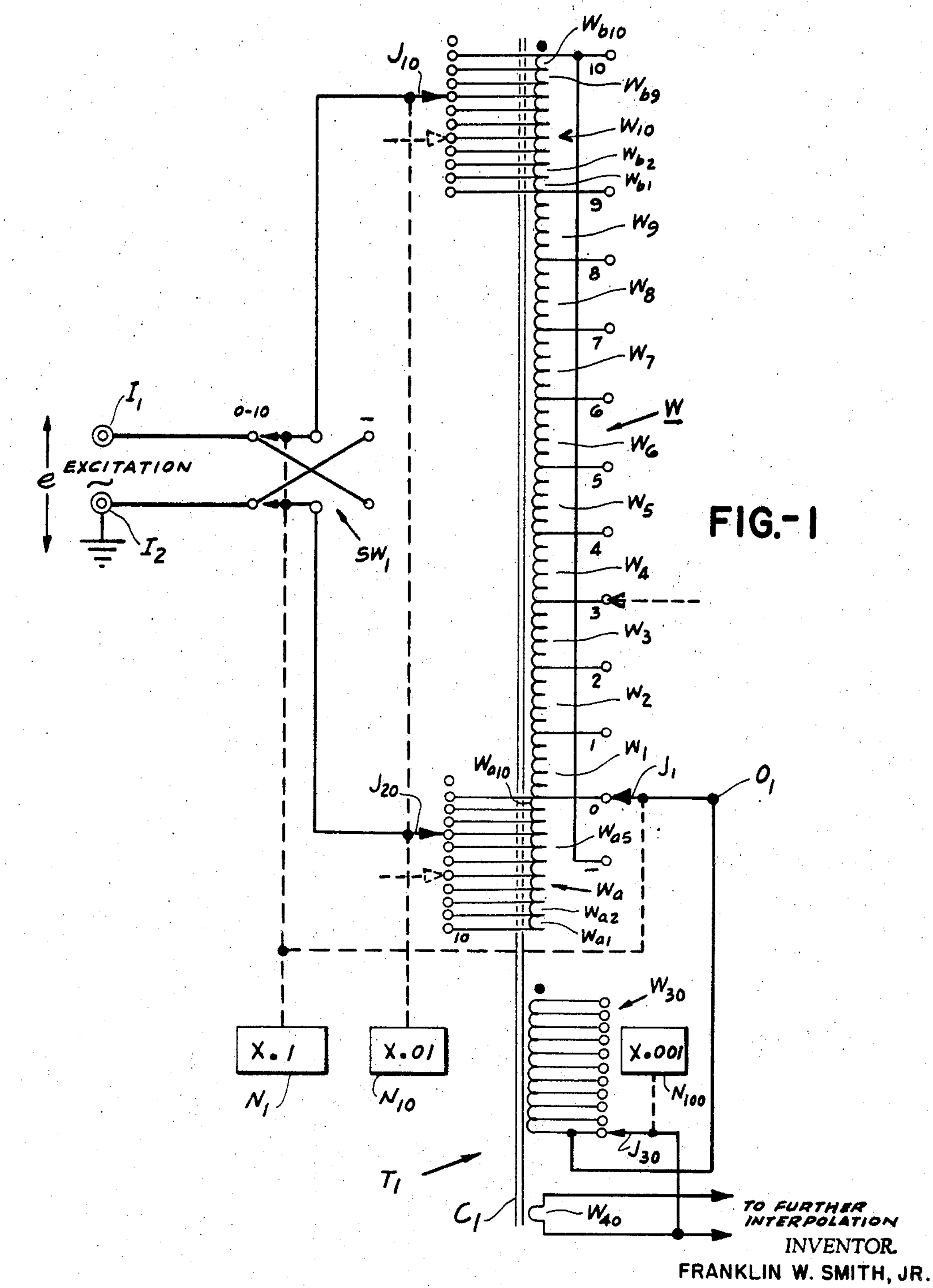

This invention relates to inductive dividers and, more particularly, to inductive dividers of high accuracy which are adapted to perform division and other arithmetic operations with a high degree of precision.

Inductive dividers (also known as transformer dividers) are frequently used for obtaining highly accurate ratios. In a typical application, a divider is energized by a reference voltage and an accurate fraction thereof is obtained by means of accurately defined taps on the divider winding. Typically, these windings are divided into ten sections to form a decade divider, and means are provided for selecting taps whereupon the desired ratio may be established. For obtaining interpolation further dividers are cascaded to the selected taps of the first divider. The dividers following the input divider are generally so connected as to interpolate the first coarse selection to achieve a net adjustable ratio of high precision, for example, to a precision of one part per million.

In inductive or transformer dividers employing primary and secondary windings and operating under open circuit, i.e., no load, conditions, there is a residual error which is caused by the primary excitation (magnetizing) current flowing through primary leakage impedances and which results in an actual transformation ratio which differs from the turns ratio. For example, in a transformer having a 1:1 turns ratio, the actual ratio may be 0.99999 whereupon an error of ten parts per million exists. An error of this magnitude can not be tolerated in many applications and it has been customary to use various methods such as a "boost compensation" technique to reduce this error to a lesser value, e.g., one part per million. Other corrective techniques include connecting the interpolating winding, which is on the same or a separate core, in shunt with the selected divider increment. This only partially compensates because only a fraction of the excitation current flows in the interpolating winding.

Even when reduced by the foregoing techniques, this error remains a basic limitation on the attainable accuracy of the inductive divider and it would be desirable to reduce this error to an even greater extent to thereby increase accuracy and extend the range of usefulness of the divider arrangement.

It is accordingly one general object of the invention to provide improved inductive divider arrangements and, specifically, to provide divider arrangements in which the foregoing error is substantially eliminated.

A further object of the invention is to provide a divider arrangement in which the above noted error is reduced by means substantially independent of frequency and in which improved accuracy is obtained without a corresponding increase in core material or complexity.

Other objects and advantages of the invention will be set forth in part hereinafter or in part will be obvious herefrom or may be learned by practise with the invention, the same being realized and attained by means of the instrumentalities, combinations and improvements herein shown and described and pointed out in the appended claims.

Figure 2:
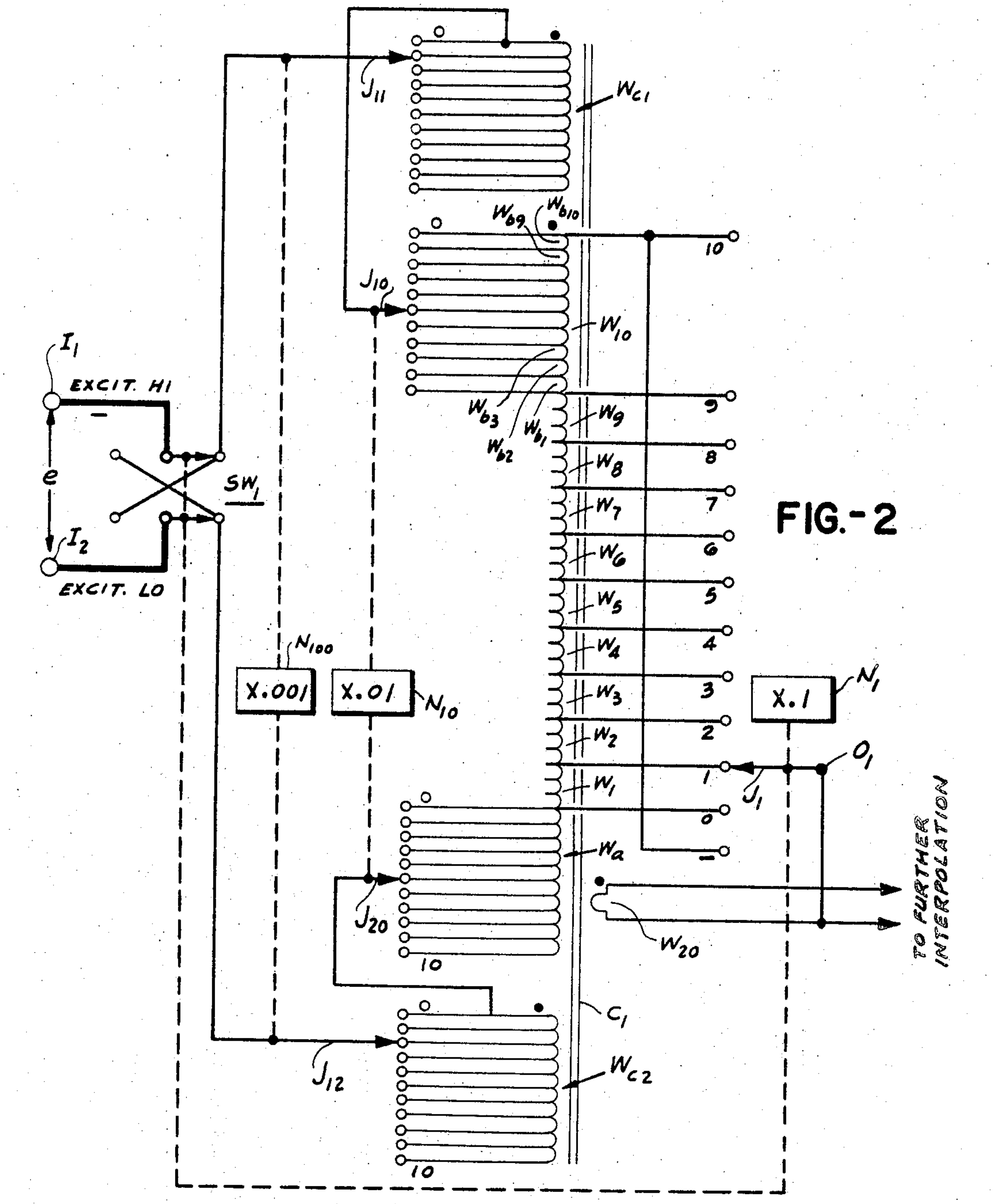
Figure 3:
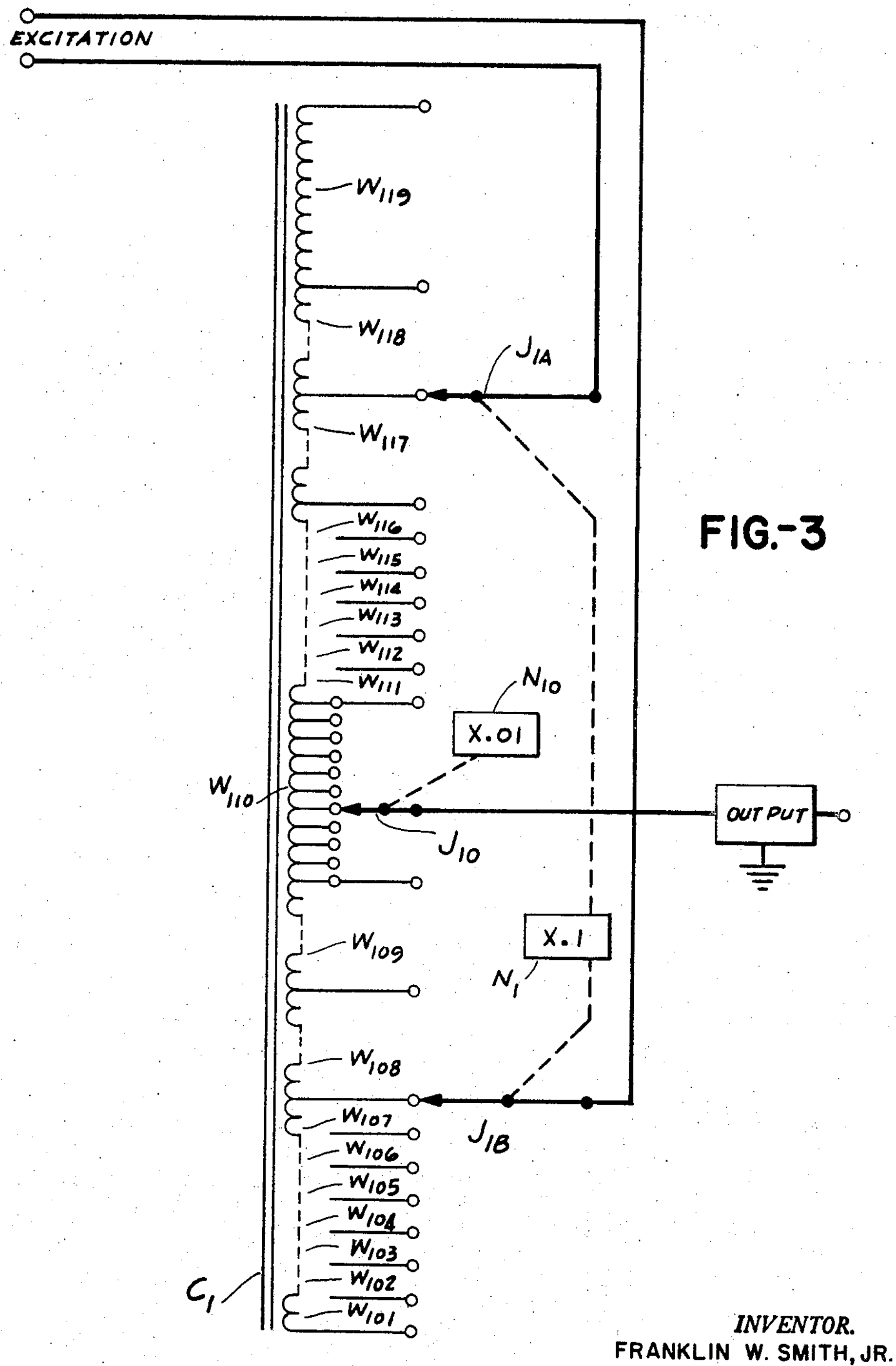

Serving to illustrate exemplary embodiments of the invention is the drawing of which FIGURE 1 is a schematic wiring diagram of a divider arrangement according to the invention; and FIGURES 2 and 3 are schematic wiring diagrams illustrating alternate embodiments of the invention.

It should be borne in mind in the following discussion that although there is an actual error condition in autotransformer type connections, there is only a very small ratio error in the selected increment of the excited divider. This is true because the voltage drops caused by the flow of excitation current are in such arrangements distributed throughout the transformer winding so that the voltages across all of the equal increments are equal. Hence the ratio is accurate.

In the arrangement of FIGURE 1, there is provided a divider arrangement $T_1$ having a winding W on a core $C_1$. Winding W is divided into eleven sections $W_a$, $W_1$, $W_2$, $W_3$ . . . $W_8$, $W_9$ and $W_{10}$, of equal turns, e.g., 100 turns. The boundaries of each of the foregoing winding sections are provided with tap connections adapted to be selectively contacted by a movable contact or brush $J_1$ operated from a control $N_1$. Brush $J_1$ is connected to output terminal $O_1$.

The upper winding section $W_{10}$ is divided in turn into ten further sections. $W_{b1}$, $W_{b2}$ . . . $W_{b10}$, having equal numbers of turns, e.g., 10. The boundaries of these further sections are provided with taps connected to respective contacts adapted to be selectively contacted by a movable contact $J_{10}$ which is connected to input terminal $I_1$ or $I_2$ according to the position of reversing switch $SW_1$ operated by control $N_1$.

In like manner to the foregoing, lower main winding section $W_a$ is further divided into ten sections, $W_{a1}$, $W_{a2}$ . . . $W_{a10}$, which illustratively contain 10 turns each. The boundaries of these sections are provided with taps and respective contacts adapted to be selectively engaged by a brush $J_{20}$. The brush $J_{20}$ is connected in turn to the input ground terminal $I_2$ or to terminal $I_1$, depending on the position of $SW_1$. Terminals $I_1$ and $I_2$ are illustratively energized by voltage *e* which may be a reference voltage or selected ratio thereof.

Brushes $J_{10}$ and $J_{20}$ are mechanically interconnected and adapted to be selectively moved by a control $N_{10}$ in such a way that when $J_{10}$ is contacting its upper contact (at the top of the winding section $W_{b10}$), its companion brush $J_{20}$ is at the top of the winding section $W_{a10}$. In relation to the figure, the brushes are adapted to move up together and down together, maintaining respective contact with corresponding contacts of the two subdivided sections $W_a$ and $W_{10}$.

It may be seen that the described arrangement comprises a first inductive divider which forms ratios in *tenths* increments with the selected tenths ratio being further modified by what is in effect a second divider, thereby yielding hundredths increments. The first divider comprises the windings and taps associated with brush $J_1$ while the second divider is constituted by the windings and contacts associated with brushes $J_{10}$ and $J_{20}$, i.e., with control $N_{10}$. In the position shown, $J_1$ and $J_{10}$, $J_{20}$, are set to provide a ratio of 0.03. In the position shown in broken lines, the ratio is 0.36.

An examination of the circuit shows that for all ratios of *unity* and less (i.e., with brush $J_1$ set at or below $J_{10}$ in the figure), the excitation current from source *e* flows through the entire portion of the winding section which is operative for any given setting of the controls $N_1$ and $N_{10}$. Since this is true, the circuit in effect provides an autotransformer connection wherein the subject error is eliminated. Viewed from another point, the entire operative section of the winding W has the excitation current flowing therethrough with the result that there is no apparent error. This condition does not obtain, however, for ratios greater than one, since a portion of the operative winding section in that case is without excitation current from the source.

By means of reversing switch $SW_1$, negative ratios up to the value $-0.1$ can be obtained when $J_1$ is set at the minus (or "10") tap and $J_{10}$ is connected to ground and varied between its limits. Output terminal $O_1$ may be connected to a further divider comprising winding $W_{30}$ on core $C_1$ and having brush $J_{30}$ for selecting the taps thereon which may divide the winding into ten equal sections, illustratively of one turn each, to provide further interpolation in increments of 0.001. For still further interpolation, brush $J_{30}$ may be connected to further winding $W_{40}$ on core $C_1$. A potentiometer or other divider arrangement, not shown, may be connected across $W_{40}$ to increase the resolution still further.

FIGURE 2 illustrates an alternate embodiment wherein brushes $J_{10}$ and $J_{20}$ are each connected to the reversing switch $SW_1$ and source $e$ via further windings $W_{c1}$ and $W_{c2}$ each tapped for decade division and wound on core $C_1$. Illustratively, these windings have 10 turns tapped to provide 1 turn increments and the respective brush $J_{11}$, $J_{12}$ is connected to the reversing switch and jointly operated by control $N_{100}$. By this arrangement, the error in the third decade is also eliminated.

It should be understood that non-decimal division, e.g., with hexade dividers, may also be practised as described above for the decade dividers.

FIGURE 3 illustrates a further embodiment wherein the interpolating winding $W_{110}$ is serially inserted between windings $W_{109}$ and $W_{111}$ of the coarse divider. The distal ends of $W_{109}$ and $W_{111}$ are connected to the equal serial coarse increments $W_{101}$ to $W_{108}$, and $W_{112}$ to $W_{119}$ respectively.

Brushes $J_{1A}$ and $J_{1B}$ selected the particular tenth increment combination to be excited, e.g., $W_{108}$ through $W_{117}$ as illustrated, the brushes being connected to the divider excitation which may be for example a reference signal or a variable. Brush $J_{10}$ selects the interpolation value and is connected to the following stages which may include further interpolation.

In the study and practice of the invention modifications will undoubtedly occur to those skilled in the art. The invention is thus not to be limited to the particular mechanisms shown and described but departures may be made therefrom within the scope of the appended claims.

What is claimed is:

1. A precision divider system having means for minimizing the effect of excitation or magnetization current in relation to leakage impedance comprising first transformer divider means and interpolating transformer divider means; a source of excitation current; interpolating selector means for varying the point of application of said excitation current to said divider system; and circuit means for driving the excitation current of said first divider means through at least a part of said interpolating divider means.

2. A divider system as defined in claim 1 in which said interpolating selector means are configured to provide a constant number of divider turns for excitation by said excitation current independent of the point of application of said excitation current.

3. A divider system as defined in claim 2 in which said interpolating selector means comprise brush means adjustably connected across a selected one of equal winding sections of said divider system.

4. A divider system as defined in claim 1 including an output circuit connected to said divider system, said output circuit and excitation current source having a common terminal.

5. Error reducing means as defined in claim 14 in which each of said selected combinations has the same number of windings and said divider arrangement has an output circuit with a terminal common to said source of excitation.

6. A divider system as defined in claim 1 in which said first and interpolating divider means are serially interconnected.

7. A divider system as defined in claim 1 in which said interpolating divider means comprise a tapped divider section connected to each end of said first divider.

8. A divider system as defined in claim 1 including further interpolating divider means connected to a selected section of said first divider means.

9. A divider system as defined in claim 1 in which said interpolating divider means comprise a first interpolating divider connected to each end of said first divider means and a second interpolating divider connected to a selected section of each of said first interpolating dividers.

10. A divider system as defined in claim 9 in which said second interpolating dividers each include said selector means for connection to said current source.

11. A divider system as defined in claim 10 including reversing means between said selector means and current source.

12. A divider system as defined in claim 9 including third interpolating means connected to a selected section of said first divider means.

13. A divider system as defined in claim 1 in which said interpolating divider is connected between sections of said first divider.

14. In a precision transformer divider arrangement having a plurality of windings including interpolated and interpolating windings and a source of excitation, means for substantially reducing ratio errors associated with excitation current flowing through primary leakage impedances, said means comprising common core means for said windings and circuit connections serially interconnecting said interpolated and interpolating windings whereby primary excitation current is selectively applied to the selected combination of said windings.

15. Error reducing means as defined in claim 14 in which said interpolating windings are connected in serial relationship between said interpolated windings and said source of excitation.

16. Error reducing means as defined in claim 14 in which said circuit means interconnect said interpolating windings serially between interpolated winding sections.

17. Error reducing means as defined in claim 14 in which said circuit means comprise means connecting interpolating windings to each end of interpolated windings and circuit connections connecting the selected sections of said interpolating windings to said source of excitation.

References Cited

UNITED STATES PATENTS

| | | | |
|---|---|---|---|
| 2,919,067 | 12/1959 | Boyd | 235—196 |
| 2,938,669 | 5/1960 | Henry | 235—196 X |
| 3,050,252 | 8/1962 | Burhans | 235—193 X |

MALCOLM A. MORRISON, *Primary Examiner.*

J. F. RUGGIERO, *Assistant Examiner.*